July 26, 1927.
C. E. OLMSTEAD
1,637,008
LIQUID COOLING DEVICE
Filed July 26, 1926
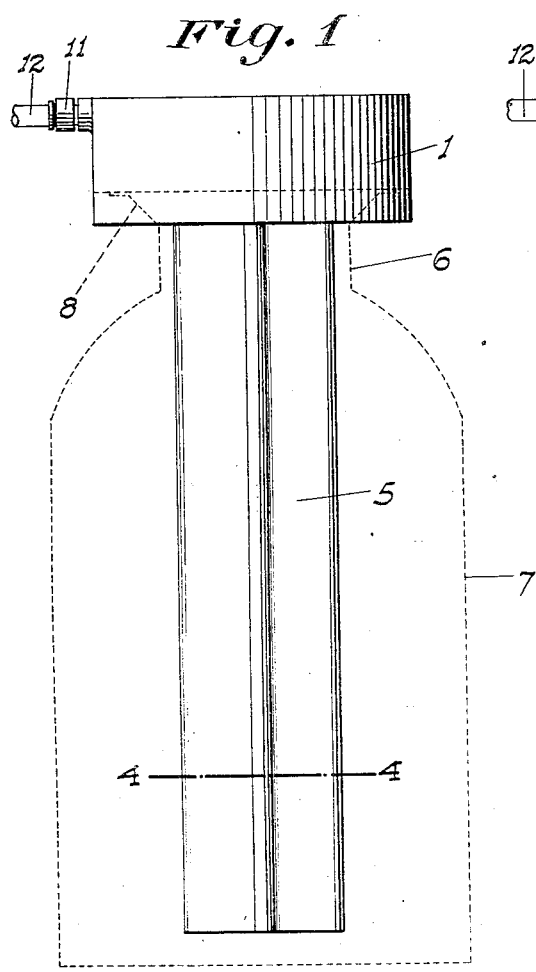
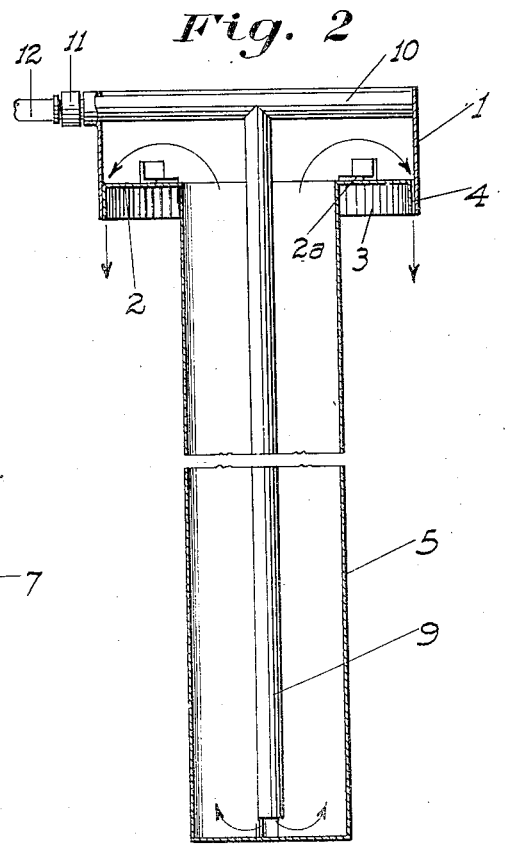
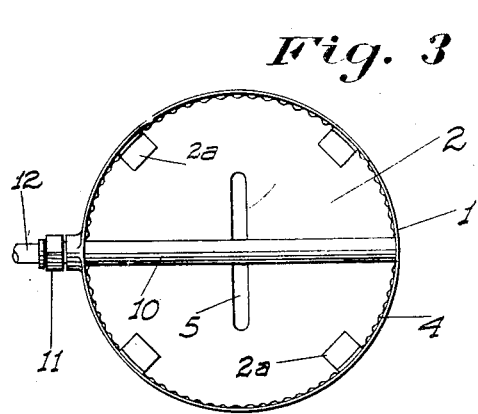
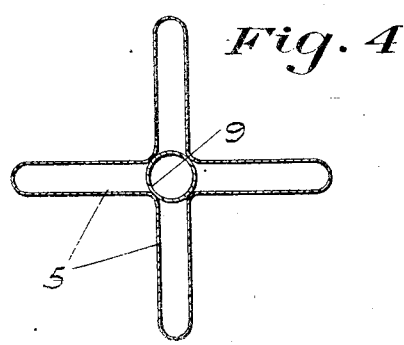
INVENTOR
C. E. Olmstead
BY
ATTORNEY Patented July 26, 1927.

1,637,008

UNITED STATES PATENT OFFICE.

CLARENCE E. OLMSTEAD, OF MODESTO, CALIFORNIA.

LIQUID-COOLING DEVICE.

Application filed July 26, 1926. Serial No. 124,939.

This invention relates to improvements in devices for cooling liquids and particularly to one especially intended for use in connection with the cooling of milk in the dairy.

The State laws require that the milk shall be cooled as soon as possible after being taken from the cows. With the present cooling apparatus in common use this requires that the milk shall be dumped from the cans, in which it is initially placed, into the cooling apparatus and subsequently returned to the cans for shipment. These operations not only take time and labor but are unsanitary if great care is not taken, since the milk is apt to absorb germs from the air as it is being poured from one container to another. Further the milk is unavoidably agitated, which has a deleterious effect. When the milk has been thus cooled and is again poured back into the cans, the cans themselves are apt to be warm and the cooling effect is therefore somewhat neutralized.

The principal object of my invention is to prevent the above named objectionable features by providing a cooling apparatus of an individual nature for each can, and so constructed that with the use of a small flow of water, the contents of the can of milk, as well as the can itself, will be efficiently cooled and without ever having to disturb or withdraw the milk from the can.

A further object is to construct the device in such a manner that the can will be cooled externally at the same time as its contents are being cooled from the inside so that the milk will be subjected to a very rapid cooling action and the length of time necessary for cooling operations is minimized.

A still further object is to provide a device which may be used with standard cans and which is so arranged that while the cover of the can must be used while the cooling apparatus is in operation, the top of the can will remain tightly closed so that dirt and dust cannot get to the contents.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved cooling apparatus shown in connection with a standard milk can.

Fig. 2 is a sectional elevation of the cooling device.

Fig. 3 is a top plan view of the cooler.

Fig. 4 is an enlarged cross section on the line 4—4 of Fig. 1.

Referring now more particularly to the characters of reference on the drawings, the device comprises a pan in the form of a cylindrical ring 1 having a bottom plate 2 located a certain distance above the bottom of the ring, the diameter of said ring being less than that of the body of a standard milk can. The bottom plate 2 has a rim flange or skirt 3 projecting downwardly to aline with the lower edge of the ring 1, said skirt being preferably vertically corrugated as at 4 so as to form a plurality of spaced openings between the bottom member 2 and the ring 1 all around the same. The bottom plate may be secured to the ring 1 by any suitable means, such as spaced angle brackets $2^a$ secured to said plate and ring.

Depending from the bottom plate 2 centrally thereof is a well 5 enclosed at its lower end. This well is preferably formed of a number of radial hollow arms as shown in Fig. 4 so as to provide a great surface area. The distance between the opposite arms is somewhat less than the diameter of the neck 6 of a standard milk can 7 so as to fit easily through said neck; while the depth of the well is such that when the plate 2 is resting on the mouth or rim 8 of the can the bottom of the well will then be slightly above the bottom of the can. The well, while having a large surface area, is of relatively small volumetric capacity or displacement, so that when inserted into a can reasonably full of milk, said well will not displace sufficient milk to cause the same to overflow from the can.

Depending into the well centrally thereof is a pipe 9 open on the bottom and terminating a short distance from the bottom of the well. The upper end of this pipe is connected to a horizontal pipe 10 which extends diametrically across the pan. One end of the pipe 10 is sealed to the ring 1 and the other end projects through said ring and has an ordinary female hose coupling member 11 mounted thereon, so that a water hose 12 having the usual corresponding coupling member may be detachably connected to the pipe 10. Said pipe being rigidly held at both ends also serves as a handle for raising and lowering the cooling device relative to the can.

In operation the cooler is mounted so that the plate 2 rests on the mouth of the can and the well depends into the same. The hose 12 is then coupled to the pipe 10 and the water is turned on sufficiently to provide a slow but continuous flow. The water travels down the pipe 9 to the bottom of the well and then passes up through the hollow arms of said well to the pan. Reaching the plate 2 the water can only escape from the pan by passing through the openings 4, the combined capacity of which relative to the volume of water preferably flowing being such that the water will rise to and remain at a certain height in the pan.

The water ultimately flowing through the well keeps the entire surface area of the well walls cool, imparting some of such coolness to the milk engaged with the walls. The water flowing down the passages formed between the pan ring and the skirt 3 falls on and all about the upper sloping sides of the can, thereby cooling the exterior surface of the can practically from top to bottom and likewise imparting a cooling effect to the milk contacting with said sides.

The provision of the skirt 3 and a corresponding length of the pan ring provides vertical discharge passages for the water of appreciable length rather than mere discharge openings, so that the water will be positively directed down against the can in a practically continuous circular spray or stream. When the milk has arrived at the desired temperature (the time depending of course on the temperature of the water being used for cooling), said water is shut off, the hose disconnected and the cooler is removed from the can.

Owing to the smooth surface of the well and the bottom plate 2—the only portions of the device engaged with the can or milk—it is very easy to keep the device in a clean and sanitary condition.

While I have specifically designated this device as being used for cooling milk, it will be obvious that said device may be used in connection with the cooling of any liquids and can be made in different shapes and sizes for different purposes.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid cooling device comprising a pan, said pan consisting of an outer irng, a bottom plate disposed intermediate the top and bottom of the ring, and a skirt depending from around the plate to the lower edge of the ring and arranged relative to the ring to form spaced vertical passages therebetween, a well closed on the bottom, open to and depending from the plate, and a pipe extending from one side of the pan into the well to adjacent the bottom thereof, the lower end of the pipe being open and the upper end being adapted for connection to a hose.

2. A liquid cooling device comprising a pan having discharge outlets at the bottom, a well open to and depending from the pan and closed on its lower end, a transverse pipe in the pan secured at one end to one side of the pan and adapted at said end for connection to a source of cooling liquid, and a vertical pipe connected to the transverse pipe and depending into the well to adjacent the bottom thereof.

3. A liquid cooling device comprising a pan having discharge outlets at the bottom, a well open to and depending from the pan and closed on its lower end, said well being in the form of a number of hollow vertical arms radiating from a common center, and a pipe adapted for connection to a source of cooling liquid depending into the central area of the well formed at the junction of the arms.

In testimony whereof I affix my signature.

CLARENCE E. OLMSTEAD.